(12) United States Patent
Bae et al.

(10) Patent No.: US 8,717,968 B2
(45) Date of Patent: May 6, 2014

(54) METHOD OF CONTROLLING REVERSE TRANSMISSION IN A MOBILE COMMUNICATION SYSTEM

(75) Inventors: Beom-Sik Bae, Taejon-Kwangyokshi (KR); Dong-Seek Park, Suwon-shi (KR); Chang-Hoi Koo, Songnam-shi (KR); Dae-Gyun Kim, Taegu-Kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 834 days.

(21) Appl. No.: 12/559,901

(22) Filed: Sep. 15, 2009

(65) Prior Publication Data

US 2010/0002673 A1 Jan. 7, 2010

Related U.S. Application Data

(63) Continuation of application No. 10/109,740, filed on Mar. 29, 2002, now Pat. No. 7,609,635.

(30) Foreign Application Priority Data

Mar. 29, 2001 (KR) .................. 10-2001-16660

(51) Int. Cl.
*G08C 17/00* (2006.01)
*H04B 7/185* (2006.01)
*H04W 4/00* (2009.01)

(52) U.S. Cl.
USPC .................... 370/318; 370/311; 370/328

(58) Field of Classification Search
USPC ............ 370/310, 342, 344, 347, 465, 468
See application file for complete search history.

(56) References Cited

U.S. PATENT DOCUMENTS

| 5,638,412 A | 6/1997 | Blakeney et al. |
| 5,825,761 A | 10/1998 | Tanaka et al. |
| 5,974,106 A | 10/1999 | Dupont et al. |
| 6,038,216 A | 3/2000 | Packer |
| 6,219,343 B1 | 4/2001 | Honkasalo et al. |
| 6,366,763 B1 * | 4/2002 | Ue et al. ................ 455/69 |
| 6,421,331 B1 | 7/2002 | Hulbert |
| 6,487,394 B1 | 11/2002 | Ue et al. |
| 6,549,785 B1 * | 4/2003 | Agin ..................... 455/522 |
| 6,563,810 B1 | 5/2003 | Corazza |
| 6,567,420 B1 | 5/2003 | Tiedemann et al. |
| 6,700,881 B1 | 3/2004 | Kong et al. |
| 6,728,217 B1 | 4/2004 | Amirijoo et al. |
| 6,731,947 B2 | 5/2004 | Hoagland et al. |
| 6,735,185 B1 | 5/2004 | Noneman |
| 6,760,313 B1 | 7/2004 | Sindhushayana et al. |
| 6,765,883 B1 * | 7/2004 | van Heeswyk ......... 370/318 |
| 6,829,489 B2 * | 12/2004 | Yamamoto et al. ...... 455/522 |
| 6,930,981 B2 | 8/2005 | Gopalakrishnan et al. |

(Continued)

FOREIGN PATENT DOCUMENTS

| EP | 0 365 885 | 10/1989 |
| JP | 2000-032561 | 1/2000 |
| JP | 2001-024578 | 1/2001 |
| KR | 1020000008081 | 2/2000 |
| KR | 100265585 | 6/2000 |
| KR | 1020000056189 | 9/2000 |
| KR | 1020000061251 | 10/2000 |
| RU | 2 085 040 | 7/1997 |
| RU | 2 145 775 | 2/2000 |
| WO | WO 99/23844 | 5/1999 |
| WO | WO 01/03357 | 1/2001 |
| WO | WO 01/24004 | 4/2001 |
| WO | WO 01/24005 | 4/2001 |
| WO | WO 01/24568 | 4/2001 |

*Primary Examiner* — Warner Wong
(74) *Attorney, Agent, or Firm* — The Farrell Law Firm, P.C.

(57) ABSTRACT

An apparatus and method for controlling a reverse data rate in a mobile station. The method includes determining whether the mobile station has sufficient power to transmit at an increased data rate compared to a current data rate, and transmitting a determination result to a base station.

11 Claims, 8 Drawing Sheets

(56) References Cited

U.S. PATENT DOCUMENTS

| | | | |
|---|---|---|---|
| 6,980,523 B1 * | 12/2005 | Lipford et al. | 370/252 |
| 7,061,888 B2 * | 6/2006 | Sakoda | 370/332 |
| 7,072,630 B2 | 7/2006 | Lott et al. | |
| 7,079,858 B2 | 7/2006 | Baker et al. | |
| 7,142,867 B1 | 11/2006 | Gandhi et al. | |
| 7,146,174 B2 | 12/2006 | Gardner et al. | |
| 7,317,711 B2 | 1/2008 | Bae et al. | |
| 7,349,368 B2 | 3/2008 | Uchida et al. | |
| 7,426,395 B2 * | 9/2008 | Stephens | 455/452.2 |
| 2002/0015388 A1 | 2/2002 | Kim et al. | |
| 2002/0021692 A1 | 2/2002 | Huh et al. | |
| 2002/0105974 A1 | 8/2002 | Cheng et al. | |
| 2002/0141349 A1 * | 10/2002 | Kim et al. | 370/252 |
| 2002/0151310 A1 * | 10/2002 | Chung et al. | 455/452 |
| 2002/0179362 A1 * | 12/2002 | Norman et al. | 180/446 |
| 2003/0045237 A1 | 3/2003 | Gardner et al. | |

* cited by examiner

METHOD OF CONTROLLING REVERSE TRANSMISSION IN A MOBILE COMMUNICATION SYSTEM

PRIORITY

This application is a Continuation of U.S. application Ser. No. 10/109,740, and claims priority to an application filed in the Korean Industrial Property Office on Mar. 29, 2001 and assigned Serial No. 2001-16660, the contents of which are incorporated herein by reference.

BACKGROUND OF THE INVENTION

1. Field of the Invention

The present invention relates generally to a transmission controlling method in a mobile communication system, and in particular, to a method of controlling reverse transmission.

2. Description of the Related Art

With the phenomenal growth of mobile communication technology, many different mobile communication systems have been proposed and are currently being field-tested. These systems generally operate based on CDMA (Code Division Multiple Access) and a 1xEV-DO (1x Evolution-Data Only) system called HDR (High Data Rate), designed to carry out high-rate data transmission dedicatedly.

Similarly to other systems, 1xEV-DO systems also require appropriate scheduling to efficiently transmit packet data on the forward and reverse links. "The forward link" is a link directed from a base station to an access terminal (AT) and "a reverse link" is the opposite link. For forward data transmission, the base station transmits data to a particular AT in the best channel condition, considering the air link statuses between the base station and 1xEV-DO ATs and other environments, resulting in a maximized data transmission throughput for the AT. Concerning reverse data transmission, a plurality of ATs access the base station simultaneously. In this situation, the base station controls overload within reverse link capacity by appropriately controlling congestion and data flows from the ATs.

Besides the 1xEV-DO systems, other mobile communication systems designed to support multimedia service must also manage reverse data transmission efficiently. To do so, system performance and capacity must be ensured.

In the existing 1xEV-DO systems, an AT carries out reverse data transmission based on an RAB (Reverse Activity Bit) and an RRL (ReverseRateLimit) message received from a base station, and tells the base station its variable data rate via an RRI (Reverse Rate Indicator). The RRI indicates to the base station the data rate at which the reverse traffic data is being sent. The base station transmits the following time-multiplexed channels to the AT: a forward MAC (Medium Access Control) channel, a pilot channel, an FAB (Forward Activity Bit) channel and an RAB channel. The RAB represents the congestion degree of the reverse link and a data rate available to the AT varies according to the RAB. The base station controls a data flow from the AT by commanding an increase/decrease in the reverse data rate using the RAB to control the overload and capacity of the reverse link. Since the RAB is broadcast to a plurality of ATs, the ATs receiving the RAB increase their data rates or reduce them uniformly according to the RAB. The transmission time (or transmission period) of the RAB is determined by Equation (1):

$$T \bmod RABlength \qquad (1)$$

to where T is system time and RABlength is the length of the RAB expressed in the number of slots. Table 1 below lists binary values representing RAB lengths. The base station transmits one of the binary values to the ATs and then the ATs calculate a slot time they receive the RAB on a forward MAC channel (F-MAC channel) using the received RABlength information and the system time.

TABLE 1

| Binary | Length (slots) |
|--------|----------------|
| 00 | 8 |
| 01 | 16 |
| 10 | 32 |
| 11 | 64 |

An AT receives a persistence vector defined in a message from the base station at or during a connection. When RAB=0, the persistence vector is set to increase the reverse data rate and when RAB=1, it is set to decrease the reverse data rate. Using the persistence vector, the AT performs a persistence test. If the persistence test is passed, the AT will either increase the reverse data rate or reduce it. If the persistence test is failed, then the AT maintains the reverse data rate.

To describe in detail, if the RAB is 0 and the persistence test is passed, the reverse data rate is increased. On the contrary, if the RAB is 1 and the persistence is passed, the reverse data rate is reduced. The success or failure of the persistence test depends on whether a generated random number satisfies a desired condition. Since the reverse data rate varies with uncertainty in probability terms, the base station does not know how many ATs increase/decrease their data rates. Time delay occurs on the reverse link until a high capacity state is transitioned to a full utilization state. In the reverse link full utilization state, overload and underload alternate. However, the base station cannot know how serious the overload or underload condition because the base station simply transmits an RAB and the ATs increase/decrease their data rates according to the results of persistence tests.

If the overload condition becomes serious, it leads to the increase of reverse data loss. On the other hand, if the underload condition becomes serious, the use efficiency of reverse channels is dropped. Therefore, there is a need for exploring a method of rapidly reaching the reverse link full utilization state and a method of increasing the use efficiency of reverse channels, while preventing the occurrence of overload in the base station.

FIG. 1 is a flowchart illustrating a reverse data rate controlling procedure for an AT in an existing 1xEV-DO system.

The AT sets its lowest available data rate at an initial reverse data transmission. If the current data rate is lower than a data rate provided in an RRL message received from a base station, the AT transmits data at the provided data rate after 32 slots (53.33 ms). On the other hand, if the current data rate is higher than the provided data rate, the AT transmits data at the provided data rate. For the subsequent reverse transmission, the AT determines its data rate by the procedure illustrated in FIG. 1. The RRL message is transmitted to the AT in determining an initial reverse data rate and resetting the reverse data rate.

After determining its data rate, the AT reports its data rate to the base station by an RRI symbol as shown in Table 2. The reverse data rate is selected among 4.8, 9.6, 19.2, 38.4, 76.8 and 153.6 kbps. This reverse data rate is reset by a message such as an RRL message or an RAB message received from the base station. Table 2 below lists RRI mappings in the 1xEV-DO system.

TABLE 2

| Data rate (kbps) | RRI symbol |
|---|---|
| 4.8 | 001 |
| 9.6 | 010 |
| 19.2 | 011 |
| 38.4 | 100 |
| 76.8 | 101 |
| 153.6 | 110 |

The base station determines the data rate of the AT from the RRI symbols as shown in Table 2 and controls the AT to reset its data rate. To aid the AT in resetting its data rate, the base station should transmit an RRL message as shown in Table 3 to the AT.

TABLE 3

| Field | Length (bits) |
|---|---|
| Message ID | 8 |
| 29 occurrences of the following two fields | |
| RateLimitIncluded | 1 |
| RateLimit | 0 or 4 |
| Reserved | Variable |

The RRL message is forward directed to control a reverse data rate. Upon receipt of the RRL message, the AT resets the reverse data rate by comparing the current reverse data rate with a data rate set in the RRL message. 29 records may be inserted in the above RRL message and each record indicates a data rate assigned to a corresponding MACindex among MACindexes 3 to 31. In Table 3, Message ID indicates the ID of the RRL message. RateLimitIncluded is a field indicating whether RateLimit is included in the RRL message. If Rate-Limit is included, RateLimitIncluded is set to 1 and otherwise, it is set to 0. RateLimit indicates a data rate assigned to a corresponding AT. The base station assigns data rates shown in Table 4 to ATs using four bits.

TABLE 4

| 0x0 | 4.8 kbps |
| 0x1 | 9.6 kbps |
| 0x2 | 19.2 kbps |
| 0x3 | 38.4 kbps |
| 0x4 | 76.8 kbps |
| 0x0 | 153.6 kbps |

All other values are invalid

During reverse data transmission, the AT monitors a F-MAC channel from the base station, especially the RAB on the F-MAC channel, and adjusts its current data rate by performing a persistence test.

Referring to FIG. 1, the AT monitors the RAB of an F-MAC channel from a base station included in the active set of the AT in step 100 and determines whether the RAB is 1 in step 102. If the AT has six sectors/base stations in its active set, it determines whether at least one of the RABs of the F-MAC channels received from the six sectors/base stations is 1. If at least one RAB is 1, the AT proceeds to step 112 and otherwise, it goes to step 104.

The case where all RABs=0 will be considered first.

If the RAB is 0, the AT performs a persistence test in step 104. The persistence test is available when the base station broadcasts the RAB to a plurality of ATs to control the amount of reverse data from the ATs. The persistence test is passed or failed depending on whether a generated random number satisfies a desired condition.

If the persistence test is passed in step 104, the AT increases its data rate (TX rate) in step 106. On the contrary, if the persistence test is failed, the AT jumps to step 120. The AT increases the TX rate in step 106 and compares the increased TX rate with a maximum allowed data rate (a max TX rate) in step 108. If the increased TX rate is higher than the max TX rate, the AT sets the TX rate to the max TX rate in step 110 and goes to step 120. If, in step 108, the increased TX rate is not higher than the max TX rate, the AT goes directly to step 120

Now, the case where at least one RAB=1 will be considered.

If the RAB is 1 in step 102, the AT performs a persistence test in step 112. If the persistence test is failed, the AT jumps to step 120. If the persistence test is passed, the AT decreases the TX rate in step 114 and compares the decreased TX rate with a minimum data rate (a min TX rate) in step 116. If the decreased TX rate is lower than the min TX rate, the AT goes to step 118 and otherwise, it jumps to step 120. The AT sets the TX rate to the min TX rate in step 118 and goes to step 120. The min TX rate can be a default data rate of 9.6 kbps or a data rate designated by some message at a call connection.

In step 120, the AT generates an RRI symbol corresponding to the set TX rate. The AT transmits the RRI symbol along with traffic data only if a traffic connection is opened between the base station and the AT. If the traffic connection is not opened, it transmits only the RRI symbol.

FIG. 2 is a diagram illustrating data transmission/reception between an AT and an HDR sector included in the active set of the AT. As illustrated in FIG. 2, F- and R-traffic channels, and F- and R-MAC channels have been established between the AT and sector 1 with a connection opened between them. No F-traffic channels are assigned to the AT from sector 2 (up to sectors 2 to 6) with no connection opened between them. In the 1xEV-DO system, the AT can maintain up to six sectors/base stations in its active set. Therefore, to determine its TX rate, the AT monitors F-MAC channels from all the sectors of the active set, especially RABs on the F-MAC channels.

Upon receipt of at least one RAB set to 1, the AT performs a persistence test to decrease its TX rate. In the persistence test, the AT generates a random number and compares it with a persistence vector defined by the base station at or during a connection. If the random number satisfies a desired condition, the AT determines that the persistence test is passed. The AT then decreases the TX rate. On the contrary, if the persistence test is failed, the AT maintains the TX rate. If the TX rate is lower than a min TX rate, the AT sets the TX rate at the min TX rate. Meanwhile, if all the RABs are set to 0 and a persistence test is passed, then the TX rate is increased. If the persistence test is failed, the AT maintains the TX rate. If the TX rate becomes higher than a max TX rate, the AT sets the TX rate to the max TX rate. Also, when the AT is limited in transmission power, it maintains the TX rate. The RAB that increases or reduces a reverse data rate is broadcast to ATs in TDM with an FAB on a forward common channel, i.e., a F-MAC channel. The ATs increase/decrease their data rates uniformly according to the RAB.

From the system's perspective, the above-described reverse transmission controlling method for the current 1xEV-DO systems simplifies bandwidth control and overhead control. However, the uniform control without considering the individual statuses of ATs brings about a bandwidth waste and decreases the data transmission efficiency of the ATs.

Moreover, a long time delay is involved in reaching a full utilization state on the reverse link, resulting in the decrease of channel use efficiency. The occurrence of an overload may lead to reverse data loss. As a result, communication quality is deteriorated.

SUMMARY OF THE INVENTION

It is, therefore, an object of the present invention to provide a method of rapidly reaching the full utilization state of a reverse link.

It is another object of the present invention to provide a method of increasing the use efficiency of a reverse link.

It is a further object of the present invention to provide a method of preventing the occurrence of an overload on a reverse link.

The foregoing and other objects of the present invention are achieved by providing a reverse transmission controlling method in a mobile communication system. After receiving forward information commanding a reverse data rate change on a forward control channel from a base station, a mobile station increases its data rate to be equal to or lower than a maximum data rate if the forward information commands a reverse data rate increase, determines whether the increased data rate can be further increased for the next frame, and transmits the determination result with information representing the increased data rate to the base station.

If the forward information commands a conditional reverse data rate increase, the mobile station increases its data rate to be equal to or lower than a maximum data rate based on information indicating whether a data rate increase is available that is determined at the previous frame transmission. Then, the mobile station determines whether the increased data rate can be further increased for the next frame and transmits the determination result with information representing the increased data rate to the base station.

If the forward information commands a conditional data rate decrease, the mobile station decreases its data rate to be equal to or higher than a minimum data rate based on information determined at the previous frame transmission indicating whether a data rate increase is available. Then, the mobile station determines whether the decreased data rate can be increased for the next frame and transmits the determination result with information representing the increased data rate to the base station.

If the forward information commands an unconditional data rate maintenance, the mobile station maintains its data rate. Then, the mobile station determines whether the maintained reverse data rate can be increased for the next frame and transmits the determination result with information representing the increased data rate to the base station.

The forward information is an extended RAB. If the forward information is received from at least two base stations, a control RAB is generated from extended RABs received from the base stations. Changing the reverse data rate is determined based on the control RAB.

If at least one of the extended RABs indicates a conditional decrease, the control RAB is set to indicate a conditional decrease. If none of the extended RABs indicate a conditional decrease and at least one of the extended RABs indicates an unconditional data rate maintenance, the control RAB is set to indicate an unconditional data rate maintenance. If none of the extended RABs indicate either a conditional decrease or an unconditional data rate maintenance and at least one of the extended RABs indicates a conditional increase, the control RAB is set to indicate a conditional increase. Finally, if all the extended RABs indicate an unconditional increase, the control RAB is set to indicate an unconditional increase.

After receiving reverse information indicating whether a reverse data rate increase is available for the next reverse frame from a mobile station, a base station determines the highest data rate allowed to the mobile station by mobile station acquisition and characteristic analysis, generates a reverse data rate value, transmits information representing the highest data rate and the reverse data rate value to the mobile station, determines an extended RAB based on the received reverse information and the current capacity of a reverse link, and transmits the extended RAB to the mobile station.

If the reverse link is in an overload state, the extended RAB is set to indicate a conditional data rate decrease. If an increase in the data rates of all mobile stations within the coverage area of the base station does not cause overload on the reverse link, the extended RAB is set to indicate an unconditional data rate increase. If the reverse link is not in an overload state and can accommodate an increase in the data rates of all the mobile stations, the extended RAB is set to indicate a conditional data rate increase. Finally, if the reverse link is not in an overload state and cannot accommodate an increase in the data rates of all the mobile stations, the extended RAB is set to indicate an unconditional data rate maintenance.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EMBODIMENTS OF THE INVENTION

Figure 1:
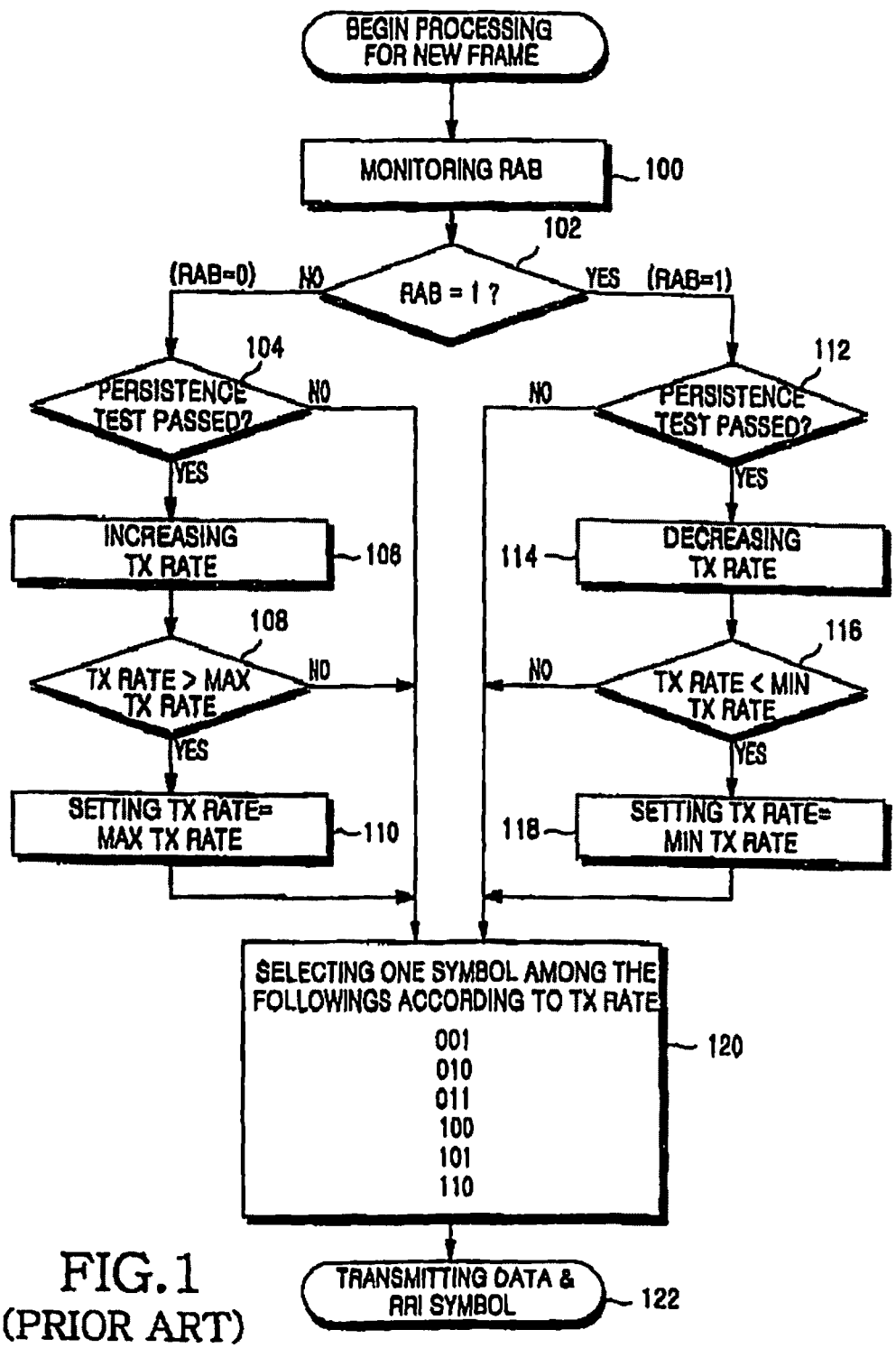
FIG. 1 is a flowchart illustrating a reverse data rate controlling method for a mobile station in a conventional mobile communication system.
Figure 2:
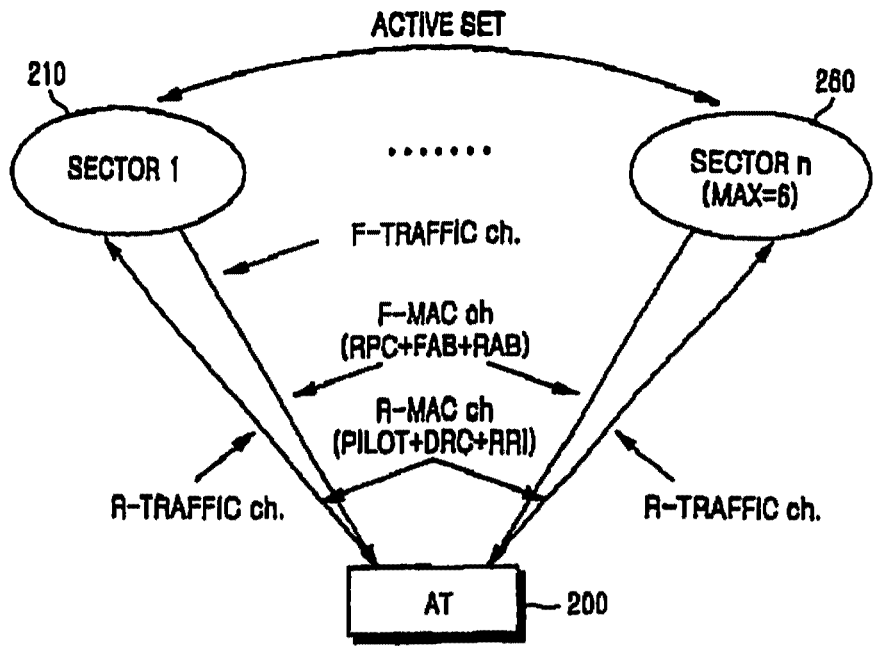
FIG. 2 is a diagram illustrating data transmission/reception between a mobile station and a sector included the active set of the mobile station.

Embodiments of the present invention will be described hereinbelow with reference to the accompanying drawings. In the following description, well-known functions or constructions are not described in detail since they would obscure the invention in unnecessary detail.

The present invention provides a reverse data rate controlling method for a mobile station (MS) and new RAB and new RRI structures for supporting the method in a system and a novel high rate data transmission system according to the present invention. A base station operation for supporting the reverse data rate controlling method is also provided. The new RAB and new RRI according to the present invention will be hereinafter referred to as an extended RAB and an extended RRI, respectively.

The extended RAB is given in Table 5.

TABLE 5

| RAB | Operation of MS |
|---|---|
| 00 | Increase reverse link data rate depending on increase previous persistence pre-test |
| 01 | Decrease reverse link data rate depending on decrease persistence test |
| 10 | Increase reverse link data rate |
| 11 | Keep current reverse link data rate |

A 1-bit RAB simply represents the increase or decrease of a reverse data rate in the conventional system, whereas the extended RAB shown in Table 5 represents the increase, maintenance, and decrease of a reverse data rate in the present invention.

(1) Extended RAB=00

A mobile station increases its data rate, only if it passed its previous increase persistence pre-test for a data rate increase in the previous frame. In this case, the reverse data rate increase is conditional.

(2) Extended RAB=01

A mobile station reduces its data rate, only if it has passed a decrease persistence test for a data rate decrease. In this case, the reverse data rate decrease is conditional.

(3) Extended RAB=10

All mobile stations increase their data rates regardless of their previous increase persistence pre-tests. That is, the reverse data rates are unconditionally increased.

(4) Extended RAB=11

All mobile stations keep their data rates regardless of their previous increase persistence pre-tests. That is, the reverse data rates are unconditionally maintained.

FIGS. 3A to 3F are flowcharts illustrating a reverse data rate controlling method for a mobile station in a data transmission system according to an embodiment of the present invention. Referring to FIGS. 3A to 3F, the mobile station monitors extended RABs received on F-MAC channels from all base stations in its active set in step 300. Only the reverse data rates that are defined by RRI symbols are available. The mobile station can maintain up to six sectors/base stations in its active set. An active set is a set of sectors/base station serving a mobile station. If a connection is opened between the mobile station and a base station in the active set, F- and R-traffic channels and a reverse power control channels are assigned to the mobile station. With no connection opened, the mobile station monitors only a control channel from the base station. The mobile station determines "a control RAB" according to a received extended RAB as follows.

(Conditions)

(1) If at least one of the extended RABs received from all of the base stations in the active set is 01, the control RAB is set to 01;

(2) If none of the extended RABs received from all of the base stations in the active set are 01 and at least one of them is 11, the control RAB is set to 11;

(3) If none of the extended RABs received from all of the base stations in the active set are either 01 or 11 and at least one of them is 00, the control RAB is set to 00; and (4) If all of the extended RABs received from all of the base stations in the active set are 10, the control RAB is set to 10.

The control RAB set under the above conditions has a great influence on the capacity of a sector in the case of a reverse data rate increase.

The mobile station checks the control RAB in steps 302 to 306. If the control RAB is 00, the mobile station determines whether its previous increase persistence pre-test was passed by checking a variable PreTestRes representing the result of the increase persistence pre-test, that is, whether PreTestRes=0 in step 310 in FIG. 3b. If the previous increase persistence pre-test was passed, the mobile station goes to step 312 and otherwise, it jumps to step 318. The mobile station increases its TX rate in step 312 and compares the increased TX rate with a max TX rate in step 314. If the increased TX rate is higher than the max TX rate, the mobile station proceeds to step 316 and otherwise, it goes to step 318. In step 316 the mobile station sets the TX rate to the max TX rate and goes to step 318. Thus, the TX rate is completely set.

In step 318, the mobile station performs an increase persistence pre-test to control the reverse TX rate for the next frame. If the increase persistence pre-test is passed, the mobile station sets the variable PreTestRes to 0 in step 320 and selects and transmits an RRI symbol representing the set TX rate in step 380 in FIG. 3f. On the contrary, if the increase persistence pre-test is failed, the mobile station sets the variable PreTestRes to 1 in step 322 and selects and transmits an RRI symbol representing the set TX rate in step 382 in FIG. 3f.

The mobile station determines that the increase persistence pre-test is failed regardless of its real implementation in the case where the TX rate is limited by an RRL message that provides a maximum allowed data rate to each mobile station, when the mobile station has too limited transmission power to increase the TX rate, or the amount of data stored in a buffer is a threshold or less (i.e., the stored data can be transmitted without increasing the TX rate).

Table 6 lists RRI mappings to reverse data rates according to the present invention.

TABLE 6

| Data rate (kbps) | Extended RRI symbol (Increase persistence pre-test success) | Extended RRI symbol (Increase persistence pre-test failure) |
|---|---|---|
| 0 | 0000 | N/A |
| 9.6 | 0001 | 1001 |
| 19.2 | 0010 | 1010 |
| 38.4 | 0011 | 1011 |
| 76.8 | 0100 | 1100 |
| 153.6 | 0101 | 1101 |
| 307.2 | 0110 | 1110 |
| 614.4 | 0111 | 1111 |
| 1024 | N/A | 1000 |

The extended RRI listed in Table 6 are a modification from the conventional RRI to indicate to the base station at what rate the reverse data is being sent. Based on the acquired reverse data rate, the base station recovers the original reverse data. The extended RRI is designed to represent the reverse data rates defined by the 1xEVDV systems with PreTestRes set in the first field.

Figure 3A:
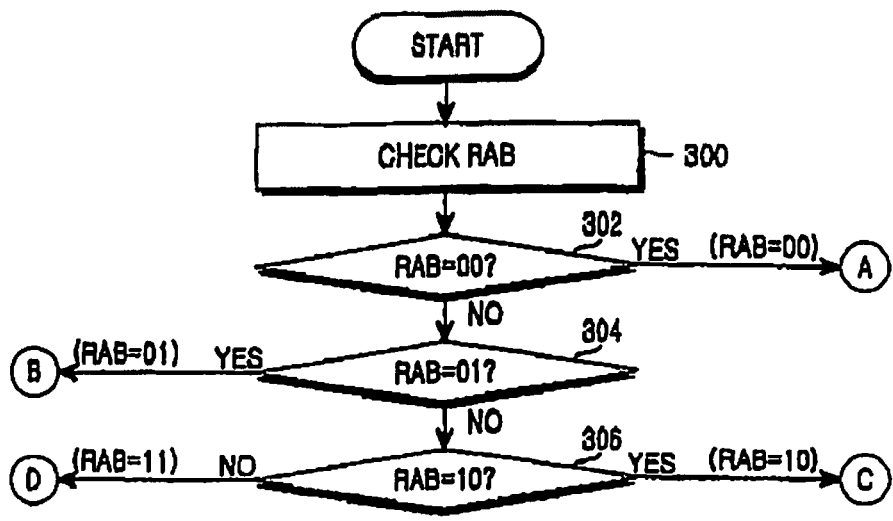
FIGS. 3A to 3F are flowcharts illustrating a reverse data rate controlling method for a mobile station in a data transmission system according to an embodiment of the present invention.
Figure 3B:
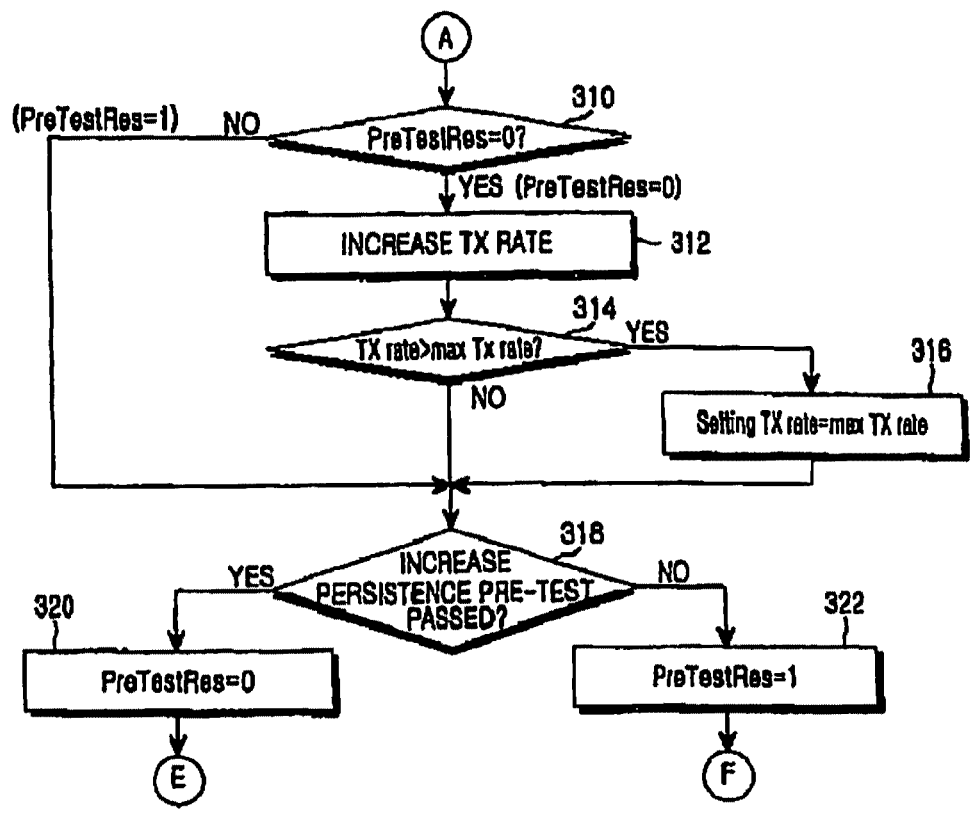
Figure 3C:
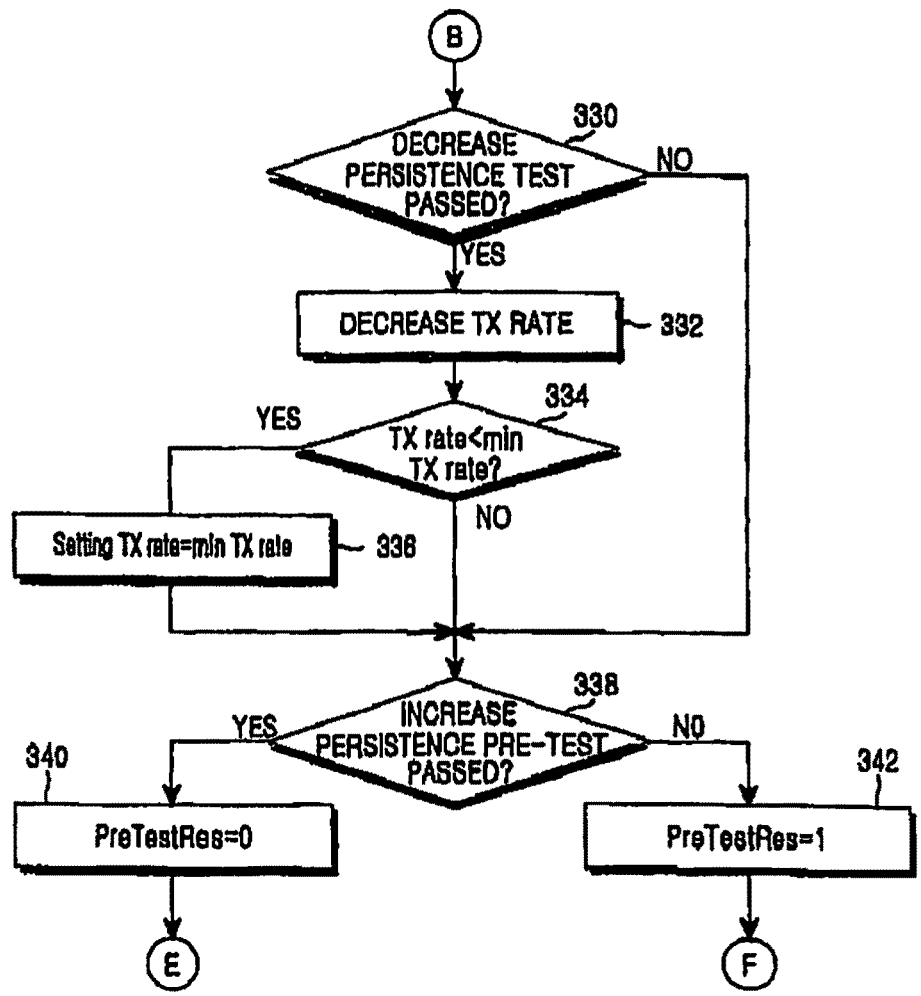
Figure 3D:
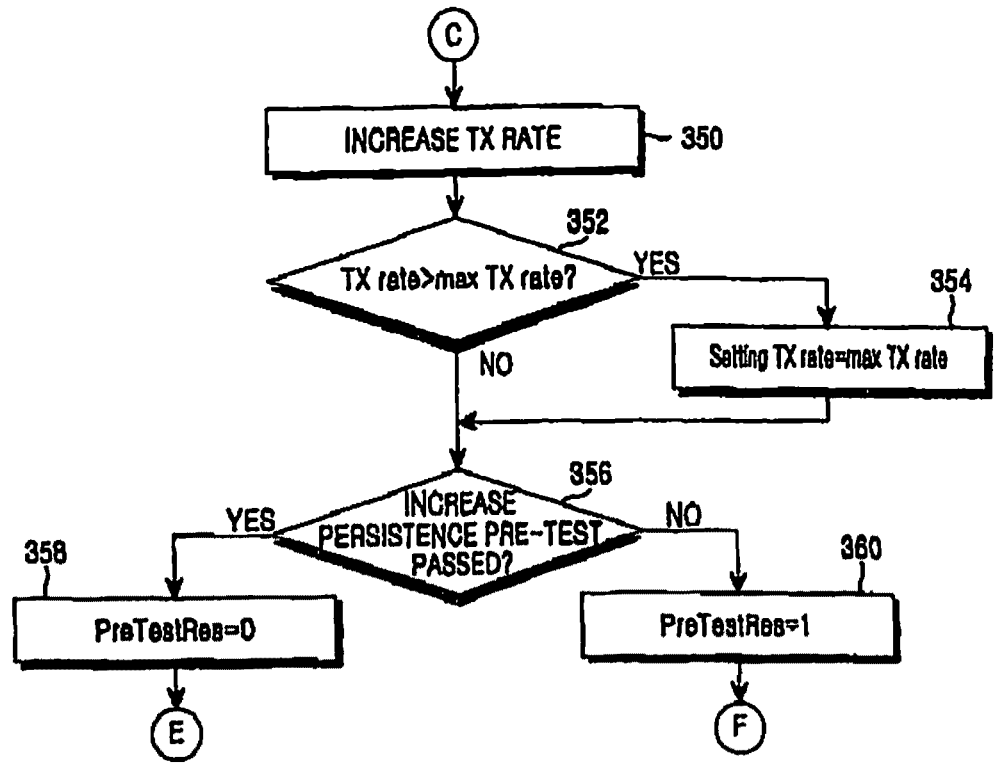
Figure 3E:
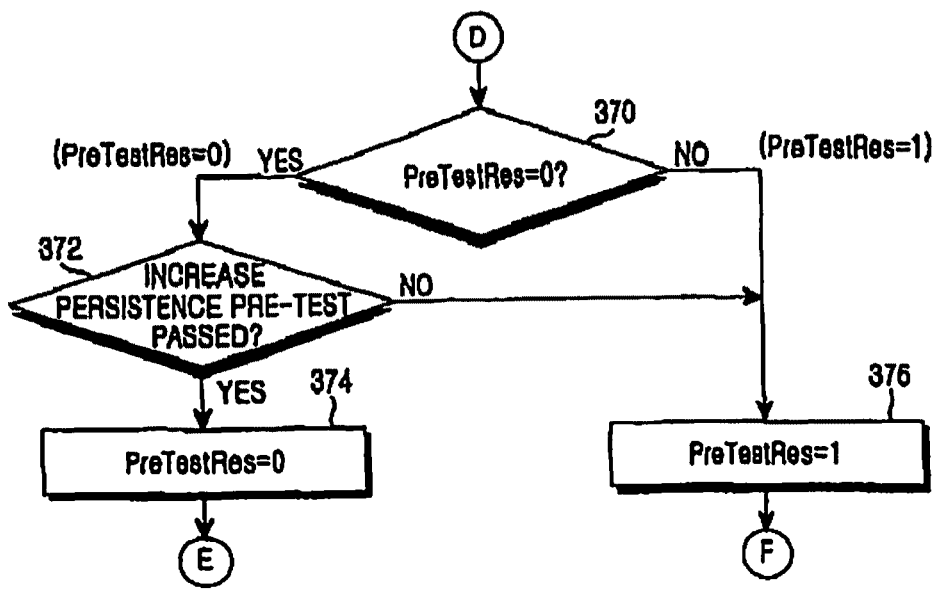

If the control RAB is 01 in step 304, the mobile station performs a decrease persistence test in step 330 in FIG. 3c. If the decrease persistence test is passed, the mobile station goes to step 332 and otherwise, it jumps to step 338. The mobile station decreases its TX rate in step 332 and compares the decreased TX rate with a min TX rate in step 334. If the decreased TX rate is lower than the min TX rate, the mobile station proceeds to step 336 and otherwise, it goes to step 338. In step 336 the mobile station sets the TX rate to the min TX rate and goes to step 338.

In step 338, the mobile station performs an increase persistence pre-test to control the reverse TX rate for the next frame. If the increase persistence pre-test is passed, the mobile station sets the variable PreTestRes to 0 in step 340, and selects an RRI symbol representing the set TX rate from a table such as Table 6 and transmits the selected RRI symbol in step 380 in FIG. 3f. On the contrary, if the increase persistence pre-test is failed, the mobile station sets the variable PreTestRes to 1 in step 342, and selects an RRI symbol representing the set TX rate from a table such as Table 6 and transmits the selected RRI symbol in step 382 in FIG. 3f.

The mobile station sets the variable PreTestRes to 1, determining that the increase persistence pre-test is failed regardless of its real implementation in the case where the TX rate is limited by an RRL message, when the mobile station has too limited transmission power to increase the TX rate, or the amount of data stored in a buffer is a threshold or less.

If the control RAB is not 10 in step 306, then the RAB must be 11. This implies that the current TX rate is supposed to be maintained. Hence, in step 370, the mobile station checks the variable PreTestRes representing the result of the previous increase persistence test, which was performed to report the reverse link condition for the previous frame in FIG. 3e. If PreTestRes is 0, that is, a TX rate increase is available, the mobile station performs an increase persistence pre-test to control the reverse TX rate for the next frame in step 372. If the increase persistence pre-test is passed, the mobile station sets the variable PreTestRes to 0 in step 374, and selects an RRI symbol representing the set TX rate from a table such as Table 6 and transmits the selected RRI symbol in step 380 in FIG. 3f.

Figure 3F:
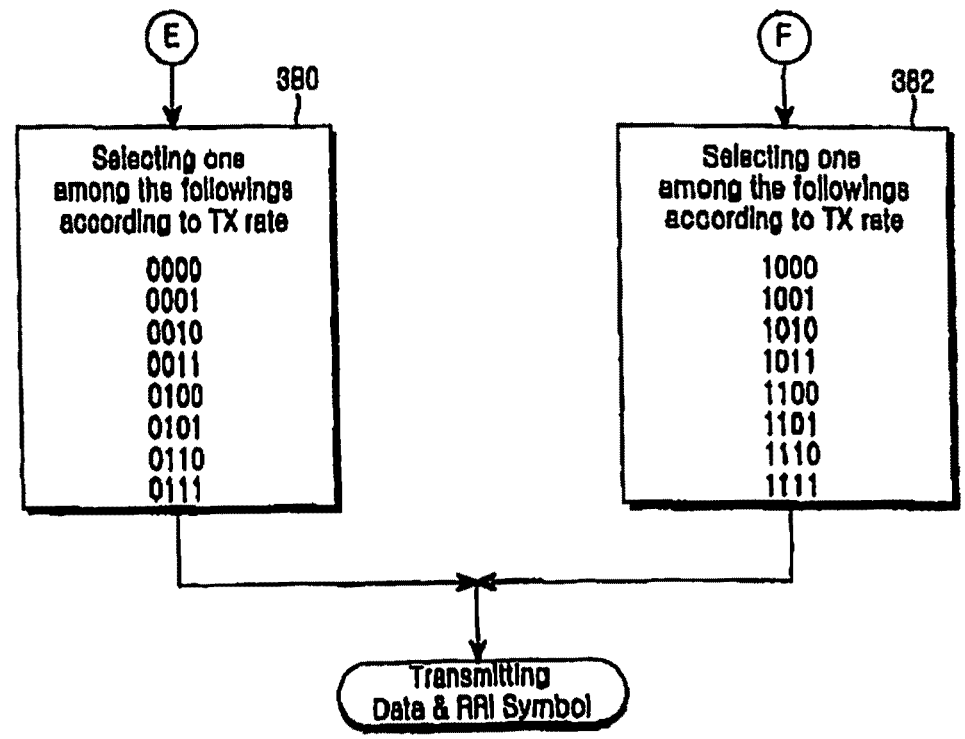

On the other hand, if PreTestRes is 1 in step 370 or if the increase persistence pre-test is failed in step 372, the mobile station sets the variable PreTestRes to 1 in step 376, and selects an RRI symbol representing the set TX rate from a table such as Table 6 and transmits the selected RRI symbol in step 382 in FIG. 3f. The reason for performing an increase persistence pre-test only in a mobile station with PreTestRes=0 despite a TX rate maintenance command by an extended RAB is to preserve the reverse link capacity.

Figure 4:
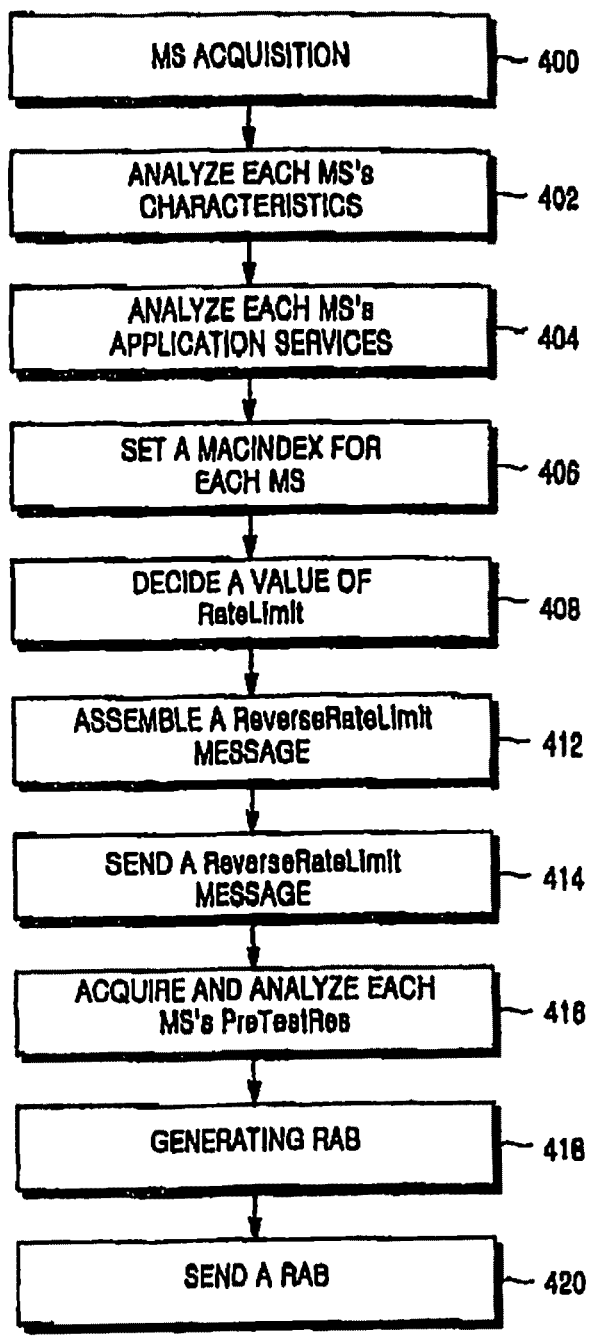
FIG. 4 is a flowchart illustrating a reverse data rate controlling method for a base station in the data transmission system according to the embodiment of the present invention.

FIG. 4 is a flowchart illustrating a reverse data rate controlling method for a base station in the high rate data transmission system according to the embodiment of the present invention.

Referring to FIG. 4, upon receipt of connection open requests from mobile stations, the base station carries out mobile station acquisition in step 400 and analyzes the characteristics of the mobile stations in step 402. In step 404, the base station analyses the characteristics of reverse traffic received from the mobile stations, that is, determines QoS (Quality of Service) of packet data services requested by the mobile stations. In steps 406, the base station sets MACindex fields by which the mobile stations are identified. The base station sets RateLimit fields that limit the data rates of the mobile stations based on the characteristics of the mobile stations and their application services in step 408. Then the base station assembles the RRL message with Message ID and other related message fields for transmission in the air in step 412 and transmits the RRL message to the mobile stations in step 414.

In step 416, the base station receives PreTestRes information indicating whether a reverse data rate increase is available for the next frames from the mobile stations and analyzes the PreTestRes information. The base station checks the current reverse channel conditions and generates an RAB according to the reverse channel conditions in step 418 and broadcasts the RAB to the mobile stations in step 420. If one RAB is set for each mobile station, the RAB may not be broadcast but must be transmitted to only the corresponding mobile station.

Figure 5:
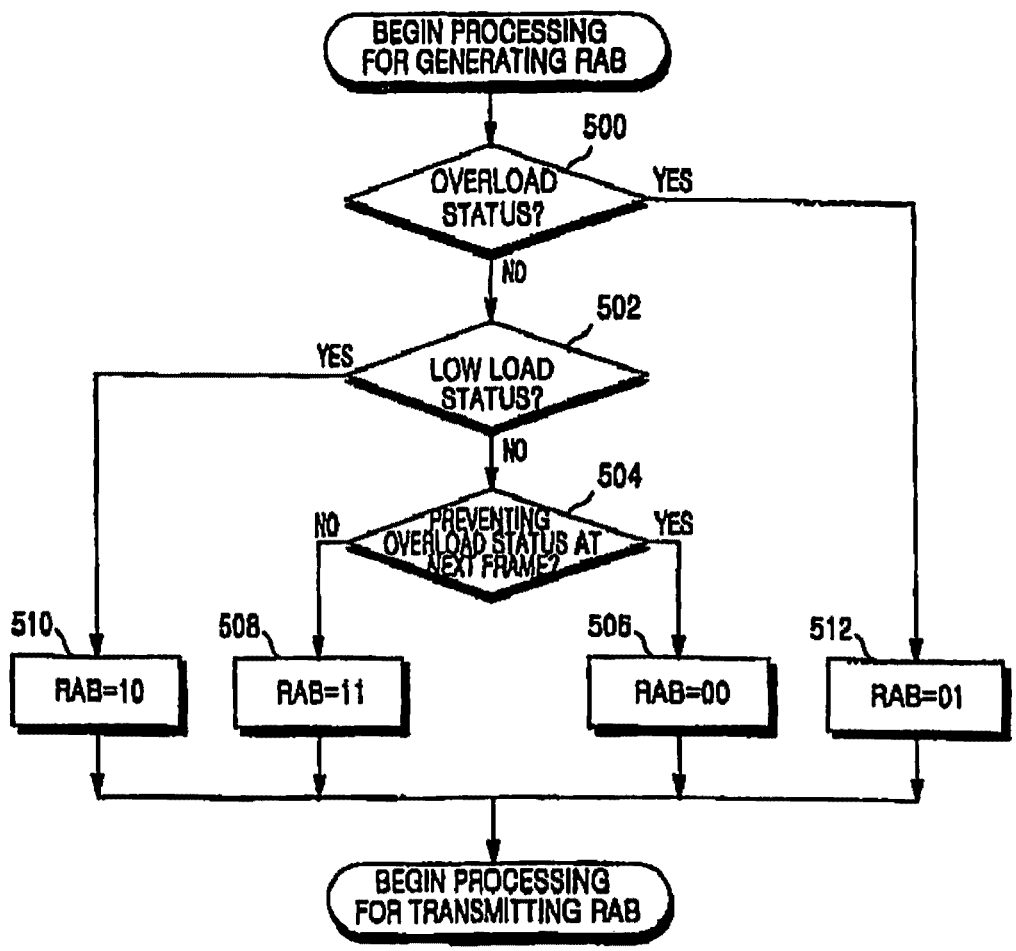
FIG. 5 is a flowchart illustrating a method of generating an extended RAB for control of reverse data rates in the base station in the data transmission system according to the embodiment of the present invention.

FIG. 5 is a flowchart illustrating a method of generating an extended RAB for control of reverse data rates in the base station in the rate data transmission system according to the embodiment of the present invention.

Referring to FIG. 5, the base station determines whether the reverse link is currently in an overload state in step 500. In an overload state, the base station sets the extended RAB to 01 in step 512. This implies that a corresponding mobile station sets a control RAB to 01 and decreases its TX rate according to a decrease persistence test.

If the current reverse link is not in an overload state in step 500, the base station determines whether the current reverse link is a low load state in step 502. In a low load state, the base station sets the extended RAB to 10.

If the current reverse link is not in a low load state in step 502, the base station checks PreTestRes information received from mobile stations to determine whether overload will occur at the next reverse transmission in step 504. If overload is expected, the base station sets the extended RAB to 11 in step 508. If no overload is expected, the base station sets the extended RAB to 00 in step 506. The set extended RAB is broadcast or transmitted to a corresponding mobile station only.

While the embodiment of the present invention has been described in the context that one mobile station uses one radio traffic channel, it can be further contemplated in other embodiments that one mobile station uses two radio traffic channels.

1) Use of One 2-Bit RAB and One 7-Bit RRI Symbol.

By representing each of the data rates of the two reverse traffic channels using one bit of the RAB, the data rates are increased/maintained/decreased simultaneously. The result of an increase persistence pre-test is represented by one bit of the RRI symbol (e.g., MSB). Three of the remaining bits of the RRI symbol are assigned to the data rate of a first reverse traffic channel and the other three bits, to the data rate of a second reverse traffic channel. The reverse data rates are increased/decreased according to the result of the increase persistence pre-test on the two reverse traffic channels and the common RAB.

(2) Use of One 2-Bit RAB and One 8-Bit RRI Symbol.

While the RAB applies commonly to the two reverse traffic channels, an increase persistence pre-test is performed independently for each of the reverse traffic channels. Therefore, the reverse data rates are changed individually. Two bits of the RRI symbol are assigned to the respective results of the increase persistence pre-tests for the reverse traffic channels. The other six bits of the RRI symbol are equally separated to be assigned to the data rates of the reverse traffic channels. The reverse data rates are increased/decreased according to the results of the increase persistence pre-tests and the common RAB.

(3) Use of Two 2-Bit RABs and One 7-Bit RRI Symbol.

One RAB is assigned for each of the reverse traffic channel. Thus, the data rates of the reverse traffic channels are changed individually. One increase persistence pre-test is performed for the two reverse traffic channels. Here a decrease persistence test can be performed commonly for the reverse traffic channels or independently for each of the reverse traffic channels. The RRI symbol is used in the same manner as the case (1). The reverse data rates are increased/decreased according to the result of the common increase persistence pre-test and the RABs.

(4) Use of Two 2-Bit RABs and One 8-Bit RRI Symbol.

One RAB is assigned for each of the reverse traffic channels and an increase persistence pre-test is also performed independently for each of the reverse traffic channels. The RRI symbol is used in the same manner as the case (2). The two reverse traffic channels are separately controlled.

The result(s) of the increase persistence pre-test(s) may be transmitted on a channel other than an RRI channel (e.g., a RICH) or on a new defined channel. While its transmission period is set preferably on a frame basis, it can be set in any other manner.

In accordance with the present invention as described above, mobile stations determine whether a reverse data rate increase is available for the next reverse transmission and tell a base station the determination results. Then the base station carries out a planned reverse link control for the next reverse transmission. Therefore, the occurrence of an overload is prevented, reverse data loss is minimized, and the transmission efficiency of the reverse link is maximized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling a reverse data transmission in a mobile station, the method comprising:
   determining whether the mobile station has sufficient power available to transmit at a higher data rate than a current data rate; and
   transmitting multi-bit control channel information to a base station,
   wherein a bit of the multi-bit control channel information indicates whether or not the mobile station has the sufficient power available to transmit at the higher reverse data rate.

2. The method of claim 1, further comprising:
   receiving forward information commanding a reverse data rate increase from the base station,
   wherein the higher data rate is indicated by the forward information.

3. The method of claim 2, wherein the forward information includes an extended Reverse Activity Bit (RAB).

4. The method of claim 3, wherein if the forward information is received from at least two base stations, a control RAB is generated from extended RABs received from the base stations, and a change in the reverse data rate is determined based on the control RAB.

5. The method of claim 4, wherein:
   if at least one of the extended RABs indicates a conditional decrease, the control RAB is set to indicate the conditional decrease;
   if none of the extended RABs indicate the conditional decrease and at least one of the extended RABs indicates an unconditional data rate maintenance, the control RAB is set to indicate the unconditional data rate maintenance;
   if none of the extended RABs indicate either the conditional decrease or the unconditional data rate maintenance and at least one of the extended RABs indicates a conditional increase, the control RAB is set to indicate the conditional increase; and
   if all the extended RABs indicate an unconditional increase, the control RAB is set to indicate the unconditional increase.

6. A method of controlling a reverse data transmission of a mobile station in a base station, the method comprising:
   receiving, from the mobile station, multi-bit control channel information indicating whether the mobile station has sufficient power available to transmit at a higher reverse data rate than a current data rate;
   determining forward information based on the reverse information; and
   transmitting the forward information to the mobile station,
   wherein a bit of the multi-bit control channel information indicates whether or not the mobile station has the sufficient power to transmit at the higher reverse data rate.

7. The method of claim 6, wherein the forward information indicates one of an increase, decrease, and maintenance of the reverse data rate.

8. The method of claim 7, wherein the forward information includes an extended Reverse Activity Bit (RAB).

9. The method of claim 7, wherein the control channel information further indicates a current capacity of a reverse link, and
   if the reverse link is in an overload state, the extended RAB is set to indicate a conditional data rate decrease,
   if an increase in the data rates of all mobile stations within a coverage area of the base station does not cause an overload on the reverse link, the extended RAB is set to indicate an unconditional data rate increase,
   if the reverse link is not in the overload state and can accommodate the increase in the data rates of all the mobile stations, the extended RAB is set to indicate a conditional data rate increase, and
   if the reverse link is not in the overload state and cannot accommodate the increase in the data rates of all the mobile stations, the extended RAB is set to indicate an unconditional data rate maintenance.

10. A mobile station apparatus for controlling a reverse data transmission, the apparatus comprising:
    a controller for determining whether the mobile station has sufficient power available to transmit at a higher data rate than a current data rate; and
    a transmitter for transmitting multi-bit control channel information to a base station,
    wherein a bit of the multi-bit control channel information indicates whether or not the mobile station has the sufficient power available to transmit at the higher reverse data rate.

11. A base station apparatus for controlling a reverse data transmission of a mobile station, the apparatus comprising:
    a controller for determining forward information based on multi-bit control channel information received from the mobile station, which indicates whether the mobile station has sufficient power available to transmit at a higher reverse data rate than a current data rate; and
    a transmitter for transmitting the forward information to the mobile station,
    wherein a bit of the multi-bit control channel information indicates whether or not the mobile station has the sufficient power to transmit at the higher reverse data rate.

* * * * *

UNITED STATES PATENT AND TRADEMARK OFFICE
CERTIFICATE OF CORRECTION

PATENT NO.        : 8,717,968 B2
APPLICATION NO.   : 12/559901
DATED             : May 6, 2014
INVENTOR(S)       : Beom-Sik Bae et al.

Page 1 of 1

It is certified that error appears in the above-identified patent and that said Letters Patent is hereby corrected as shown below:

In the Claims

In Claim 1, column 11, lines 26-28:

"determining whether the mobile station has sufficient power available to transmit at a higher data rate than a current data rate;"

should be

--determining whether the mobile station has sufficient power available to transmit at a higher reverse data rate than a current data rate;--.

In Claim 2, column 11, lines 38-39:

"wherein the higher data rate is indicated by the forward information."

should be

--wherein the higher reverse data rate is indicated by the forward information.--.

In Claim 10, column 12, lines 39-41:

"a controller for determining whether the mobile station has sufficient power available to transmit at a higher data rate than a current data rate;"

should be

--a controller for determining whether the mobile station has sufficient power available to transmit at a higher reverse data rate than a current data rate;--.

Signed and Sealed this
First Day of July, 2014

Michelle K. Lee
*Deputy Director of the United States Patent and Trademark Office*